May 16, 1967 A. ROVELL 3,320,590

SWITCHING SYSTEM FOR SELECTIVELY CONNECTING PLURAL SIGNAL SOURCES TO OUTPUT CHANNELS

Filed Sept. 12, 1963

INVENTOR.
ALEXANDER ROVELL

BY A. M. Fernandez

ATTORNEY

United States Patent Office 3,320,590

Patented May 16, 1967

3,320,590

SWITCHING SYSTEM FOR SELECTIVELY CONNECTING PLURAL SIGNAL SOURCES TO OUTPUT CHANNELS

Alexander Rovell, Pico Rivera, Calif., assignor to North American Aviation, Inc.

Filed Sept. 12, 1963, Ser. No. 308,545
10 Claims. (Cl. 340—147)

This invention pertains to a low-level signal switching system and more particularly to a system for selectively connecting any one of a plurality of magnetic reading heads to a selected one of two output channels, or selectively connecting any two reading heads, one to each of two output channels, at the same time.

In the design of a digital computer, a major consideration is its organization and control. Quite often it is desirable to overlap or parallel certain fundamental operations. For example, it is often desirable to simultaneously read an operand and an instruction from memory. In a computer having a magnetic disc or drum memory, this can be readily accomplished by simply providing two separate output channels, one leading to an instruction register and the other leading to another register, such as a register associated with the arithmetic unit of the computer. However, that requires a read-head selection system capable of switching low voltage signals from any reading head to a selected output channel.

The problems normally encountered in designing a switching system for selectively connecting one of a group of low-level signal sources to a single output channel are more imposing in designing a system for switching one of a group of sources to one of two output channels. For instance, in a magnetic drum or disc memory system, noise becomes a major problem, particularly if non-return-to-zero (NRZ) recording is used (such that pulses occur only when there is a change in the value of the binary digits being read successively from one to zero or zero to one) because NRZ recording does not allow automatic gain control in the read amplifier. On the other hand, in selectively connecting reading heads to one of two output channels each having constant gain amplifiers, a D.C. shift may occur on the input line to the amplifier as reading heads are switched, thereby necessitating either a synchronous clamp to restore the desired level or sufficient transition time for the D.C. level to be restored through the impedance of the amplifier.

A general object of this invention is to provide an improved low-level signal switching system.

Another object is to provide an improved system for selectively connecting any one of a plurality of low-level signal sources to a selected one of two output channels.

Another object is to provide a switching system for low-level signals which does not introduce any appreciable D.C. shift upon switching the amplifier or output channel from one low-level signal source to another.

Another object is to provide a system for simultaneously switching any two of a group of signal sources to a separate one of two output channels.

Still another object is to provide a switching system that enables the load on each signal source to be held constant within close tolerances during the time that it is switched to either of two output channels.

Another object is to provide a switching system in which the voltage gain through the selecting switches may be adjusted such that different amplitude signals from different sources are adjusted to a desired common amplitude.

Another object is to provide a switching system in which the amplitude and duration of transient noise which occurs during switching from one signal source to another are minimized.

Another object is to provide a switching system in which no biasing currents are allowed to flow from the output channels through the switches in order to reduce the offset voltages of the switches to a very low magnitude.

Another object is to provide a low-level signal switching system in which the impedance of a shunt switch associated with an unselected low-level signal source is minimized for high attenuation of noise.

Still another object is to provide a low-level signal switching system in which the loading on each signal source is readily adjusted to a common value.

Another object is to provide a low-level signal switching system in which voltages are not being switched in lines which lead to an output channel in order to virtually eliminate switching transients in the output signal.

Another object is to provide a signal switching system in which the allowable number of signal sources connected to an output channel is not limited by the capacitance of the switches.

These and other objects of the invention are achieved in a low-level read-head switching system by shunting all unselected reading heads to ground. A discrete resistor is connected between the shunt switch of each head and the common input terminal to an output channel. The output channel includes a first amplifier capacitively coupled to the selecting switches so that bias current is not allowed to flow through the switches. The amplifier is a transistor connected in a common-base configuration so that the input impedance of the amplifier is extremely low as compared to the resistance of the discrete resistors coupling the selecting switches to the output channel to assure that essentially all of the signal current from the selected head flows into the transistor amplifier. A separate discrete resistor is connected in parallel with each head and its value selected or adjusted to make the loading on each read-head equal to one common value of resistance. The coupling resistors are selected for separate gain adjustment in each head as required to make the parallel combination of that resistor and its associated parallel resistor equal to the desired head load.

Still another discrete resistor may be connected in series with each head to increase the source impedance of its associated head sufficiently to attenuate unwanted signals below a desired amplitude. In a system having a single output channel to which the reading heads are to be selectively connected, the second terminal of each head is permanently connected to ground. In a read-head selection system having two output channels to which any one of the heads are to be selectively connected, the second terminal of each head is coupled to the second output channel by a coupling resistor and coupled to ground by a shunt switch.

Other advantages of the invention will become apparent from the following description with reference to the drawing in which.

In the following description of FIG. 1 subscripts are employed to identify those switching circuit components associated with reading heads $L_1$, $L_2$ . . . $L_n$. When a component applies to the switching circuit for a second output channel, it is distinguished by a prime; and when it applies to an arbitrary reading head $L_i$, it is distinguished by the subscript $i$.

Figure 1:
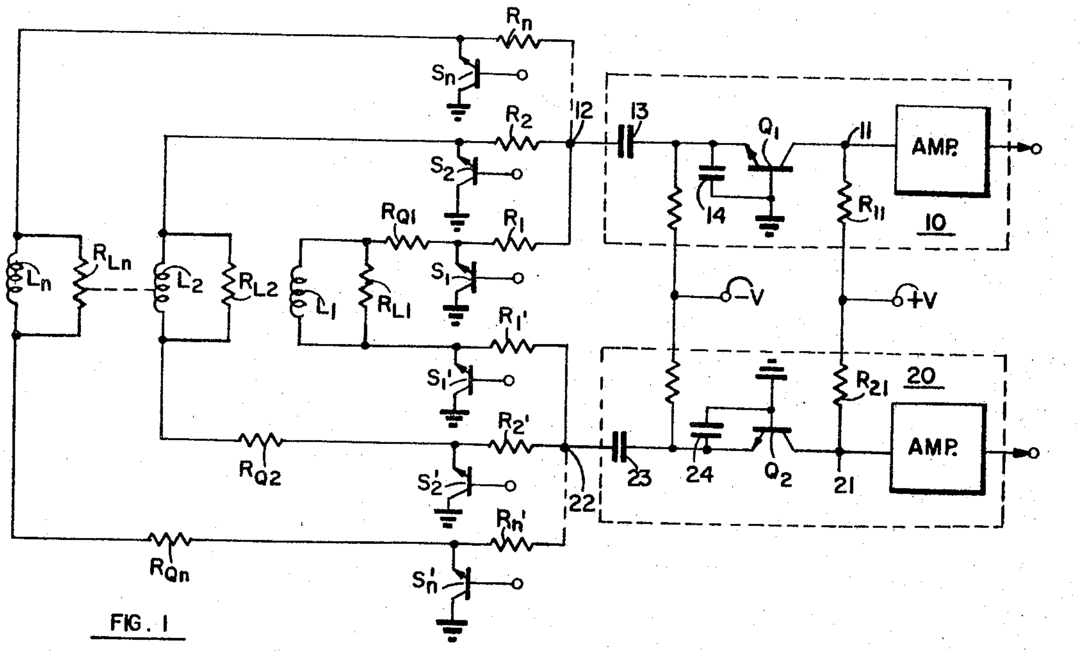
FIG. 1 is a schematic diagram of a read-head selecting system implemented in accordance with the present invention for selectively connecting one of a plurality of reading heads to either one of two output channels.
Figure 2:
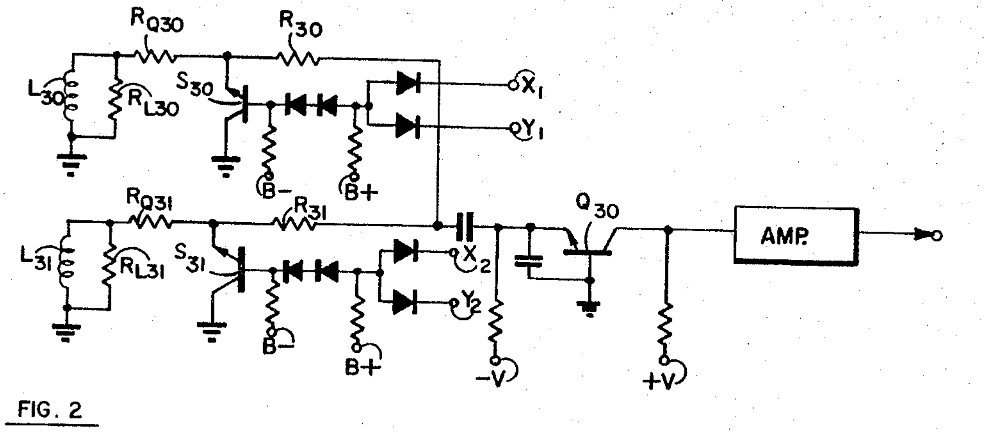
FIG. 2 is a schematic diagram of a read-head selecting system for selectively connecting a reading head to a single output channel.

Although the low-level signal selecting systems shown schematically in FIGS. 1 and 2 are described with reference to selecting reading heads of a magnetic disc or drum memory, it should be understood that the invention may be used with other low-level signal sources.

In order to better understand the invention, it may be assumed that the signal amplitudes of reading heads $L_1$, $L_2 \ldots L_n$ vary from 100 millivolts to 500 millivolts peak to peak and that the required read-head loading is in the order of 20,000 ohms when its output is switched to one of two output channels 10 and 20. It may be further assumed that the gain requirement between the output of each selected head and points 11 and 21 within the output channels 10 and 20 is unity (1) or less.

Each of the read-heads $L_1, L_2 \ldots L_n$ is floating with respect to system ground and is shunted on one side by a corresponding one of a first plurality of switches $S_1$, $S_2 \ldots S_n$ and on the other side by a corresponding one of a second plurality of switches $S_1', S_2' \ldots S_n'$. Each head $L_i$ is followed by a resistor $R_i$ on one side and by a resistor $R_i'$ on the other side in series. All of the resistors $R_1, R_2 \ldots R_n$ are connected to a common point 12 which is coupled to a common base amplifier $Q_1$ within the output channel 10 by a capacitor 13. Similarly all of the resistors $R_1', R_2' \ldots R_i'$ are connected to a common point 22 which is coupled to a common base amplifier $Q_2$ in the output channel 20 by a capacitor 23. In addition there is a discrete resistor $R_{L1}, R_{L2} \ldots R_{LN}$ connected directly in shunt with each of the respective heads $L_1, L_2 \ldots L_N$. The allowable number of paralleled heads is not limited by the capacitances of the switching elements $S_i$ and $S_i'$ as would be the case if a series switching element were employed instead of the shunt switches shown.

No biasing or other D.C. currents flow between the switching arrangement and the output channels 10 and 20 due to the coupling capacitors 13 and 23 which couple the respective common-base amplifiers $Q_1$ and $Q_2$ to points 12 and 22. In that manner the offset voltages of the switched signals are maintained at a very low value. If the offset voltages of the switched signals are below an acceptable magnitude, the various switches need not be matched. If the offset voltages exceed the acceptable magnitude, offset variation from one switch to another should not be greater than the acceptable offset from any one switch. In most applications the signals being switched are much greater in amplitude than the typical offset voltages experienced. Accordingly, matching of offset voltages by selecting components is seldom required in practice.

In operation, assume it is desired to switch the signal from reading head $L_2$ to the channel 10 and the signal from the reading head $L_1$ to channel 20. In order to accomplish that, all switches are closed except $S_2$ and $S_1'$, thereby causing the head $L_2$ to be grounded on one side and its signal to be transmitted through the coupling resistor $R_2$ which couples the signal to the emitter of the common-base amplifier $Q_1$ in the output channel 10. The impedance seen looking into the emitter of the common base amplifier $Q_1$ is extremely low (in the order of 30 ohms); therefore, if the equivalent resistance of all of the remaining coupling resistors connected to ground in parallel (such as the resistor $R_1$ and the resistor $R_n$ in parallel connection to ground by respective switches $S_1$ and $S_n$) is much greater than the impedance looking into the emitter of the amplifier $Q_1$, essentially all of the signal current from the selected head $L_2$ flows into the emitter of the amplifier $Q_1$. The signal $e_{11}$ at the output of the amplifier $Q_1$ is given by the expression $$e_{11}=\frac{\alpha R_{11}}{R_2}e_2\simeq\frac{R_{11}e_2}{R_2} \qquad (1)$$

where $e_2$ equals signal amplitude of read-head $L_2$; $\alpha$ equals the small signal, common-base, forward current transfer ratio of transistor $Q_1$; and $R_{11}$ equals the total impedance in the collector circuit of transistor $Q_1$. Similarly the signal at the output of the amplifier $Q_2$ is given by the expression $$e_{21}=\frac{\alpha R_{21}}{R_1'}e_1\simeq\frac{R_{21}e_1}{R_1'} \qquad (2)$$

While signals from heads $L_2$ and $L_1$ are being transmitted through the respective output channels 10 and 20, each of the other reading heads has both its end terminals connected to ground. The signal which flows through each of the unselected reading heads is inversely proportional to its reactance, or source impedance. The voltage signal appearing across a closed switch which may be denominated a noise signal $e_n$ is given by the expression $$e_N=\frac{e_i R_{si}}{Z_i} \qquad (3)$$

where $e_i$ equals open circuit signal voltage at read-head $L_i$, $R_{si}$ equals impedance of a closed switch $S_i$ and $Z_i$ equals source impedance of the unselected head $L_i$. Accordingly, the noise voltage $e_{N11}$ contributed by one unselected read-head $L_i$ to the output signal of the amplifier $Q_1$ is given by the expression $$e_{N11}=e_N\alpha\frac{R_{11}}{R_i} \qquad (4)$$

where $e_N$ is as defined by Equation 3. The total noise signal appearing at the output of the transistor $Q_1$ due to imperfections of the switches is given by the expression $$e_{TN11}=e_N\alpha\frac{R_{11}}{R_i}(N-1)\simeq e_N\frac{R_{11}}{R_i}N \qquad (5)$$

where N is the number of heads.

The total noise voltage appearing at the output terminal 21 of the amplifier $Q_2$ is given by the same expression except that $\alpha$ would be equal to the small signal, common-base, forward current transfer ratio of the transistor $Q_2$ which should be substantially the same as for the transistor $Q_1$.

The function of switches $S_i$ and $S_i'$ is conveniently provided by inverted common-emitter switches as shown. Each switch has a typical impedance of approximately 10 ohms while it is conducting and introduces an offset voltage of approximately 1 millivolt when it is switched. Such a low impedance reduces the noise signal developed across the switch and therefore increases the allowable number of reading heads which may be switched to the points 12 and 22.

Figure 3:
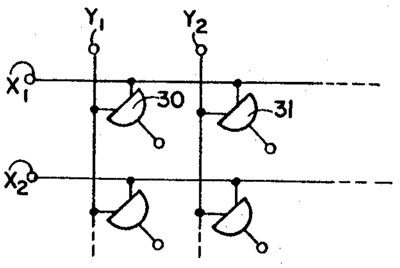
FIG. 3 is a schematic diagram of a coordinate array of read-head selecting switches.

Most any type of conventional logic network can be easily coupled to the base of the transistor switches $S_i$ and $S_i'$ to control their conductive state and thereby select their associated reading head $L_i$. The most commonly used logic network is a diode matrix; however, if NAND gates are employed for the switches, such as the switches $S_{30}$ and $S_{31}$ illustrated in FIG. 2, the selecting matrix may actually comprise the switches themselves as illustrated in FIG. 3 where each logic element such as the logic elements 30 and 31 comprise NAND-gate switches such as the switches $S_{30}$ and $S_{31}$ in FIG. 2.

It often occurs that the signal amplitudes of the reading heads are different. In order to provide a constant output amplitude at points 12 and 22 of FIG. 1 for all of the heads, the voltage gain between the heads and the points 12 and 22 must be appropriately adjusted. This is readily accomplished by adjusting the values of the resistors $R_i$ or $R_i'$ to fit the gain requirements of the individual reading head $L_i$. Such an adjustment for a particular head has no effect on the operation or characteristics of the other heads. Accordingly, the gain of the individual head-selecting circuits may be adjusted to provide a uniform signal amplitude at the points 12 and 22.

If gain adjustment is required in the selecting circuit of a given head $L_i$ which calls for different value of resistor $R_i$ or $R_i'$ that is different from the required head load, the head load can be adjusted by appropriately selecting the resistor $R_{Li}$ such that the parallel combination of the resistor $R_{Li}$ and its associated coupling resistor $R_i$ or $R_i'$ equals the desired head load. Such an adjustment has no effect on the operation of the other switches. Thus the function of the resistor $R_{Li}$ is to adjust the head load impedance which is preferably held at a specified constant. If the adjustment of the coupling resistor $R_i$ made to satisfy the amplitude requirement results in a value of $R_i$ which is not equal to the desired head load, then $R_{Li}$ may be chosen such that $$R_{LD}=\frac{R_{Li}R_i}{R_{Li}+R_i} \quad (6)$$

where $R_{LD}$ is equal to the desired reading head load. A typical value of resistance in ohms for a head load $R_{LD}$ is $20K\pm15\%$, at a given time.

In one typical application it has been determined that the required values of the coupling resistors $R_i$ and $R_i'$ for the same read-head $L_i$ can be different by as much as $\pm7.8\%$ from their average value, and considering the effective tolerance of those resistors $R_i$ and $R_i'$, as much as $\pm11.5\%$. Therefore, in order to maintain a load impedance $R_{LD}$ of $20K\pm15\%$ in such a typical application, it is necessary to choose a value of $R_{Li}$ which most nearly satisfies the relation $$\frac{R_{Li}R_x}{R_{Li}+R_x}-R_{LD}=R_{LD}-\frac{R_{Li}R_y}{R_{Li}+R_y} \quad (7)$$

where $R_x$ represents either $R_i$ or $R_i'$, whichever is larger, and $R_y$ represents either $R_i$ or $R_i'$ whichever is smaller. The relationship expressed by that equation may be represented graphically in order to simplify the selection of the value $R_{Li}$. However, since it is convenient to have the signal amplitude at points 12 and 22 equal, coupling resistors $R_i$ and $R_i'$ may be made equal. Then the loading of the head according to Equation 7 remains constant for either switch $S_i$ closed and $S_i'$ open, or switch $S_i$ open and $S_i'$ closed.

If the source impedance of a given reading head $L_i$ is not sufficient to attenuate unwanted signals below a desired value, a resistor $R_{Qi}$ may be placed in series with it, such as the resistor $R_{Q1}$ in series with the head $L_1$ and the resistor $R_{Q2}$ in series with the head $L_2$. Of course those resistors need not be provided if not required for noise attenuation. If provided, the output amplitude at the points 12 and 22 are still varied by adjustment of the coupling resistors $R_i$ and $R_i'$. The amplitude is then given by the expressions $$e_{11}\simeq\frac{R_{11}}{R_{Qi}+R_i}e_i;\ e_{21}\simeq\frac{R_{21}}{R_{Qi}+R_i}e_i \quad (8)$$

The head load $R_{LD}$ is then given by the expression $$R_{LD}=\frac{(R_{Qi}+R_i)R_{Li}}{(R_{Qi}+R_i)+R_{Li}} \quad (9)$$

The provision of resistors in series with the heads, such as the resistors $R_{Q1}$ and $R_{Q2}$ has an additional advantage in that it increases the attenuation of noise and allows a greater number of reading heads, or low-level signal generators, to be connected to the points 12 and 22. The expressions for the noise voltage signals appearing at points 11 and 21 are given by the following respective expressions $$e_{N11}\simeq\frac{e_iR_{si}R_{11}N}{(Z_i+R_{Qi})R_i} \quad (10)$$

$$e_{N21}\simeq\frac{e_iR_{si}'R_{21}N}{(Z_i+R_{Qi})R_i'} \quad (11)$$

where the terms are as defined hereinbefore with reference to Equations 3 and 4.

Since the impedance of the switches shunting signals from unselected heads to ground is very low (in the order of 10 ohms), the unwanted signal contributed by each switch is at a minimum thereby allowing a maximum number of reading heads to be connected to the points 12 and 21, and since the voltages are not being switched within the output channels 10 and 20, switching transients are almost eliminated. The only source of voltage transients into the output channels is the base emitter capacitance of the switches. To minimize switching transients from that source, the voltage swing at the base of each switch may be limited. Alternatively, switching transients may be minimized by reducing the capacitance of the base emitter diode of the switches or limiting the rise time of the voltage swing at the base of the switches.

It should be noted that the signals switched to the output of output channel 20 have the opposite polarity of the same signals if they were switched to the output channel 10. Since the information is usually delivered to a bistable element or flip-flop of the computer, the inversion of the signals can be rectified by simply utilizing the opposite output terminals of the bistable element or flip-flop. Alternatively, the output channel 20 may be coupled to the bistable element or flip-flop by an inverting amplifier.

The circuit configuration of the common base amplifiers $Q_1$ and $Q_2$ need not be as shown in FIG. 1. A more sophisticated configuration of a common base amplifier, such as an amplifier using a complementary pair of transistors may be more desirable for a specific application. The capacitors 14 and 24 coupling the emitters of the respective transistors $Q_1$ and $Q_2$ to ground are provided to filter high frequency noise which may be coupled to the emitters of the transistors from their environment.

The circuit shown in FIG. 1 has been designed to meet a specific low-level signal switching requirement. The principles of this invention may be used for a different application such as a head selecting system to a single output channel as shown in FIG. 2. In that case, $R_{Qi}$ may comprise the internal impedance of the read-head $L_i$ or it may be a discrete resistor, or both of these in series. Maximum attenuation of a single $e_i$ with switch $S_i$ closed occurs when $R_{Qi}$ is equal to $R_i$ for a specified gain and a specified value of impedance in the collector circuit of transistor $Q_3$. Thus for the circuit of FIG. 2 maximum attenuation of signals from the heads $L_{30}$ and $L_{31}$ occurs when the respective resistors $R_{Q30}$ and $R_{Q31}$ are equal to the coupling resistors $R_{30}$ and $R_{31}$. Similarly, for the circuit of FIG. 1 maximum attenuation of signals from a given head $L_i$ occurs when the resistor $R_{Qi}$ is equal to the coupling resistor $R_i$.

While the principles of the invention have now been made clear in an illustrative embodiment, there will be immediately obvious to those skilled in the art other low-level switching applications, and many modifications in structure, arrangement, proportions, the elements, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. In combination a plurality of signal sources, each connected in series between two terminals, first and second output channels, each having a separate input terminal, a first plurality of impedance elements, one for each source, coupling one terminal of each of said sources to the input terminal of said first output channel, a second plurality of impedance elements, one for each source, coupling the other terminal of each of said sources to the input terminal of said second output channel, a first plurality of switches, one coupled to said one terminal of each of said signal sources, for shunting to a source of reference potential all signals to said first output channel except from a selected signal source, and a second plurality of switches, one coupled to said other terminal of each of said signal sources, for shunting to a source of reference potential all signals to said second output channel except from a selected source.

2. The combination as defined in claim 1 wherein each of said switches comprises a transistor having its emitter connected directly to a junction between one of said impedance elements and one of said signal sources, and having its collector at A.C. ground.

3. The combination as defined in claim 2 wherein said output channel comprises a coupling capacitor directly connected to said input terminal of said output channel.

4. The combination as defined in claim 3 wherein each of said impedance elements comprises a discrete resistor.

5. In combination a plurality of magnetic reading heads, each having two terminals, first and second output channels, a first plurality of impedance elements for coupling a first one of said terminals of each head to said first output channel, a second plurality of impedance elements for coupling a second one of said terminals of each head to said second output channel, a first plurality of switches, one coupled to the first terminal of each head, for shunting to a source of reference potential all signals to said first channel except from a selected head, and a second plurality of switches, one coupled to the second terminal of each head, for shunting all signals to said second channel except from a selected head.

6. The combination as defined in claim 5 wherein each of said switches comprises a transistor having its collector connected directly to said source of reference potential and its emitter connected directly to one of said impedance elements.

7. The combination as defined in claim 6 wherein each of said channels includes an amplifier capacitively coupled to said impedance element.

8. The combination as defined in claim 7 wherein each of said impedance elements comprises a discrete resistor.

9. The combination as defined in claim 8 including a plurality of discrete resistors, each in parallel with one of said heads.

10. The combination as defined in claim 9 including a plurality of discrete resistors, each in series with one of said heads.

References Cited by the Examiner

UNITED STATES PATENTS

| | | | |
|---|---|---|---|
| 2,958,857 | 11/1960 | Johnson et al. | 340—147 |
| 3,228,002 | 1/1966 | Reines | 340—149 |
| 3,229,254 | 1/1966 | Kegelman | 340—166 |

NEIL C. READ, *Primary Examiner.*

H. PITTS, *Assistant Examiner.*